(12) United States Patent
Chin et al.

(10) Patent No.: US 7,437,544 B2
(45) Date of Patent: Oct. 14, 2008

(54) DATA PROCESSING APPARATUS AND METHOD FOR EXECUTING A SEQUENCE OF INSTRUCTIONS INCLUDING A MULTIPLE ITERATION INSTRUCTION

(75) Inventors: Ann Sekli Chin, Austin, TX (US); David James Williamson, Austin, TX (US)

(73) Assignee: ARM Limited, Cambridge (GB)

( * ) Notice: Subject to any disclaimer, the term of this patent is extended or adjusted under 35 U.S.C. 154(b) by 145 days.

(21) Appl. No.: 11/117,723

(22) Filed: Apr. 29, 2005

(65) Prior Publication Data
US 2006/0248320 A1    Nov. 2, 2006

(51) Int. Cl.
*G06F 15/00*    (2006.01)

(52) U.S. Cl. ............................. 712/241; 712/215; 712/7

(58) Field of Classification Search ................ 712/241, 712/1, 23; 708/523
See application file for complete search history.

(56) References Cited

OTHER PUBLICATIONS

Intel(R) Embedded Pentum(R) Processor Family, Developer's Manual, Dec. 1998.*

* cited by examiner

*Primary Examiner*—Henry Tsai
*Assistant Examiner*—Cheng-Yuan Tseng
(74) *Attorney, Agent, or Firm*—Nixon & Vanderhye P.C.

(57) ABSTRACT

A data processing apparatus and method are provided for executing a sequence of instructions including at least one multiple iteration instruction. The data processing apparatus comprises an instruction store for storing the sequence of instructions, and a processing unit for executing the sequence of instructions, the processing unit comprising at least a first processing path and a second processing path to enable at least two instructions of the sequence to be executed in parallel. When executing instructions in parallel, the first processing path executes an instruction which is earlier in the sequence than the instruction executing in the second processing path. The processing unit is operable when executing a multiple iteration instruction to allow a first iteration of the multiple iteration instruction to be executed in either the first processing path or the second processing path, but to cause all remaining iterations of the multiple iteration instruction to be executed in the first processing path. This provides a particularly efficient technique for executing the sequence of instructions.

6 Claims, 4 Drawing Sheets

DATA PROCESSING APPARATUS AND METHOD FOR EXECUTING A SEQUENCE OF INSTRUCTIONS INCLUDING A MULTIPLE ITERATION INSTRUCTION

BACKGROUND

1. Technical Field

The present invention relates to a data processing apparatus and method for executing a sequence of instructions including a multiple iteration instruction, and in particular to execution of such a sequence of instructions within a data processing apparatus having multiple processing paths to enable multiple instructions to be executed in parallel.

2. Description of the Prior Art

A data processing unit that has multiple processing paths to enable instructions to be executed in parallel is often referred to as a superscalar processor. One such superscalar processor may have a first processing path and a second processing path to enable two instructions to be executed in parallel. It will be appreciated that the superscalar processor may also in addition have further processing paths so as to increase the number of instruction that can be executed in parallel.

One design of superscalar processor is the so-called "in-order" design, where instructions are "retired" in the same order as they appear in the original sequence of instructions to be executed by the processor. Retirement occurs on completion of execution of the instruction, and typically involves the write back of a result value to a register file or the like.

Considering the earlier example of a superscalar processor having two processing paths, when two instructions are executed in parallel, the instruction appearing earlier in the instruction sequence (referred to herein as the earlier instruction) will typically be routed to a predetermined one of the processing paths, whilst the other instruction (referred to herein as the later instruction) will be routed to the other processing path. If both instructions then reach their respective retirement stage at the same time, they can be retired together. If however the later instruction has some data dependency with regard to the earlier instruction, as would for example be the case if one of the source registers for the later instruction is the destination register for the earlier instruction, then at some point during execution the later instruction will typically stall until such time as the result of the execution of the earlier instruction is available. In this case, the earlier instruction will retire first and the later instruction will retire at some subsequent point.

From the above comments, it will be appreciated that whilst the earlier and later instructions (also referred to herein as the first and second instructions, respectively) will start execution in parallel, they will not necessarily complete execution in parallel. When referring in the present application to instructions "executing in parallel", this is intended to refer to the act of those instructions entering their respective processing paths at the same time, and hence beginning to execute in parallel, irrespective of whether they continue to execute in parallel throughout all of the stages of execution.

In some embodiments, superscalar processors may be required to execute a sequence of instructions that includes at least one multiple iteration instruction. A multiple iteration instruction is a single instruction which needs to be iteratively executed multiple times, typically with different source operands for each iteration. Examples of such multiple iteration instructions are load multiple instructions which cause a sequence of data values to be stored from memory into a register file, and store multiple instructions which cause a sequence of data values to be stored back to memory from the register file. Another example of such a multiple iteration instruction is a data processing instruction that needs to iterate multiple times through the processing paths. One particular example is a multiply-accumulate instruction that performs the computation A+(B*C). If the processor design only has two read ports for the register file, then on a first iteration the processor can read operands B and C, and compute the product P (i.e. B*C). On a second iteration the processor can then read operand A and compute the sum A+P.

To effectively handle multiple iteration instructions, additional decode logic is typically required over and above the standard decode logic required to handle standard instructions. To avoid the area and power costs of replicating such additional decoders, it is often the case that a superscalar processor will only provide such additional decode logic within one of the processing paths, and will cause all such multiple iteration instructions to be routed through that processing path. Typically that processing path will be the one used to execute the earlier instruction when multiple instructions are being executed in parallel.

In a strict in-order design, to ensure in-order retirement, it is often the case that the processor will only allow an instruction following a multiple iteration instruction in the sequence to be issued into one of the processing paths in parallel with the last iteration of the multiple iteration instruction. This hence ensures that the later instruction will not "overtake" the multiple iteration instruction and hence reach the retirement stage ahead of the multiple iteration instruction.

Whilst the above approach can avoid the area and power costs of replicating multiple iteration instruction decode logic across multiple processing paths, it can result in a significant degradation in processing speed for certain sequences of instructions, and accordingly it would be desirable to provide an improved technique for handling a sequence of instructions including at least one multiple iteration instruction when executing those instructions in a processing unit having multiple processing paths.

SUMMARY

Viewed from a first aspect, a data processing apparatus comprises: an instruction store operable to store a sequence of instructions including at least one multiple iteration instruction; a processing unit operable to execute the sequence of instructions, the processing unit comprising at least a first processing path and a second processing path to enable at least two instructions of the sequence to be executed in parallel, when executing instructions in parallel, the first processing path being operable to execute an instruction which is earlier in the sequence than the instruction executed in the second processing path; the processing unit being operable when executing the at least one multiple iteration instruction to allow a first iteration of the multiple iteration instruction to be executed in either the first processing path or the second processing path but to cause all remaining iterations of the multiple iteration instruction to executed in the first processing path.

The processing unit is operable when executing a multiple iteration instruction to allow a first iteration of the multiple iteration instruction to be executed in either the first processing path or the second processing path, thereby increasing flexibility as to the choice of path to be used, and hence avoiding delays in beginning execution of the multiple iteration instruction that might otherwise occur when using known prior art techniques.

Further, the processing unit causes all remaining iterations of the multiple iteration instruction to be executed in the first processing path, irrespective of whether the first iteration was executed in the first processing path or the second processing path. By taking such an approach, the logic required to ensure in-order instruction retirement is significantly less complex than would be the case if on letting the first iteration of a multiple iteration instruction execute in the second processing path, all remaining iterations were allowed to also execute in the second processing path. In particular, no lock-out mechanism needs to be provided in the first processing path to prevent later instructions executing in that path whilst further iterations of the multiple iteration instruction are still being generated.

In one example embodiment, the processing unit employs a strict in-order retirement scheme, and the processing unit is operable when executing the at least one multiple iteration instruction to not allow execution of an instruction later in the instruction sequence until execution of the last iteration of the multiple iteration instruction. Hence, the instruction following the multiple iteration instruction in the instruction sequence cannot be executed until the last iteration of the multiple iteration instruction occurs, at which point it can be fed into the second processing path so as to allow it to be executed in parallel with the last iteration of the multiple iteration instruction.

It will be appreciated that the processing unit may take a variety of forms. In one embodiment, the first and second processing paths of the processing unit are pipelined processing paths such that a plurality of instructions can be in the process of execution in each of the first and second pipelined processing paths.

In one example embodiment, each of the first and second pipelined processing paths includes multiple decode stages, each decode stage comprising decode logic for at least partially decoding an instruction in that decode stage, in the second pipelined processing path only the decode logic of a first decode stage including multiple iteration decode logic operable to decode a multiple iteration instruction. Hence, in accordance with this embodiment, whilst multiple iteration decode logic needs to be provided in the first decode stage of the second pipelined processing path in order to allow for the flexibility of issuing the first iteration of a multiple iteration instruction into either the first processing path or the second processing path, there is no need for such multiple iteration decode logic to be provided in any subsequent decode stage of the second pipelined processing path, since all subsequent iterations of the multiple iteration instruction will be executed in the first processing path. This assists in keeping down the area and power costs of the data processing apparatus.

Viewed from a second aspect, a data processing apparatus comprises: instruction storage means for storing a sequence of instructions including at least one multiple iteration instruction; processing means for executing the sequence of instructions, the processing means comprising at least first processing path means and second processing path means for enabling at least two instructions of the sequence to be executed in parallel, when executing instructions in parallel, the first processing path means executing an instruction which is earlier in the sequence than the instruction executing in the second processing path means; the processing means being arranged, when executing the at least one multiple iteration instruction, to allow a first iteration of the multiple iteration instruction to be executed in either the first processing path means or the second processing path means but to cause all remaining iterations of the multiple iteration instruction to executed in the first processing path means.

Viewed from a third aspect, a sequence of instructions is executed within a data processing apparatus including at least one multiple iteration instruction, the data processing apparatus having a processing unit comprising at least a first processing path and a second processing path to enable at least two instructions of the sequence to be executed in parallel, the method comprising the steps of: when executing instructions in parallel, executing within the first processing path an instruction which is earlier in the sequence than the instruction executing in the second processing path; and when executing the at least one multiple iteration instruction, allowing a first iteration of the multiple iteration instruction to be executed in either the first processing path or the second processing path but causing all remaining iterations of the multiple iteration instruction to executed in the first processing path.

DETAILED DESCRIPTION

Figure 1:
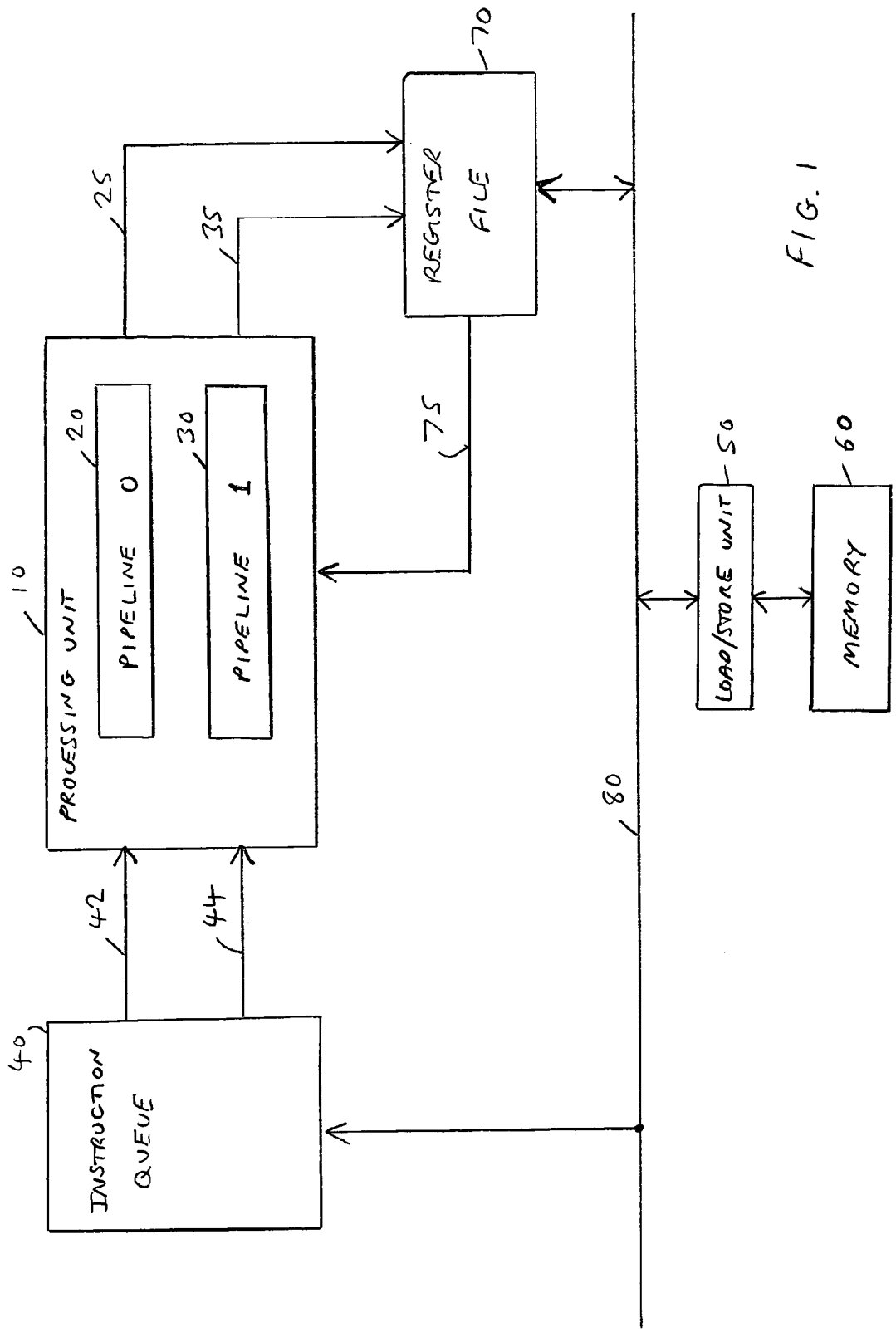
FIG. 1 is a block diagram of a data processing apparatus in accordance with one embodiment of the present invention.

FIG. 1 is a block diagram of a data processing apparatus in accordance with one embodiment of the present invention. The data processing apparatus has a processing unit 10 which is a superscalar processor having a pipeline zero 20 and a pipeline one 30, each of which can be used to execute instructions forming an instruction sequence held in the instruction queue 40. Accordingly, when the conditions for executing two instructions in parallel are determined to exist, two instructions can be output from the instruction queue over paths 42, 44, respectively, to cause those instructions to be executed in parallel within the pipelines 20, 30. The result data produced by those pipelines 20, 30 is then output over paths 25, 35, respectively to the register file 70, where those result data values are stored in destination registers specified by the corresponding instructions.

The instructions will typically specify source operands containing data values required as input data upon which the instruction is to be executed. At some point during the decoding of an instruction within either pipeline 20, 30, the source registers in the register file 70 containing that source operand data will be determined, and at this point the source data can be input to the processing unit 10 over path 75.

A memory 60 is provided for storing instructions and data required by the data processing apparatus, the memory 60 being accessed via load/store unit (LSU) 50. The LSU 50 can be used to load instructions from memory 60 for routing over the bus infrastructure 80 to the instruction queue 40 in preparation for routing to the processing unit 10 for execution. Further, the LSU 50 can be used to load data from the memory 60 into the register file 70, and also to store data from the register file 70 into memory 60.

In one example embodiment, the processing unit 10 is a main processing unit of the data processing apparatus, and the LSU 50 is controlled by that main processing unit to retrieve from memory 60 instructions for the instruction queue 40, and also to handle the loading and storing of data to and from the register file 70. However, in an alternative embodiment, the processing unit 10 is provided within a coprocessor of the data processing apparatus. In this embodiment, the LSU 50 may actually consist of two separate load/store units. A first LSU will be provided in the coprocessor, and will be arranged to control the loading of data values from the memory 60 into the register file 70 of the coprocessor, and to control the storage of data from the register file 70 to the memory 60. A separate load/store unit will typically be provided in association with the main processing unit for controlling the loading of instructions from memory 60 to the instruction queue 40. In one embodiment, such instructions will be routed via an instruction fetch unit and integer pipeline of that main processor (not shown in FIG. 1).

Figure 2:
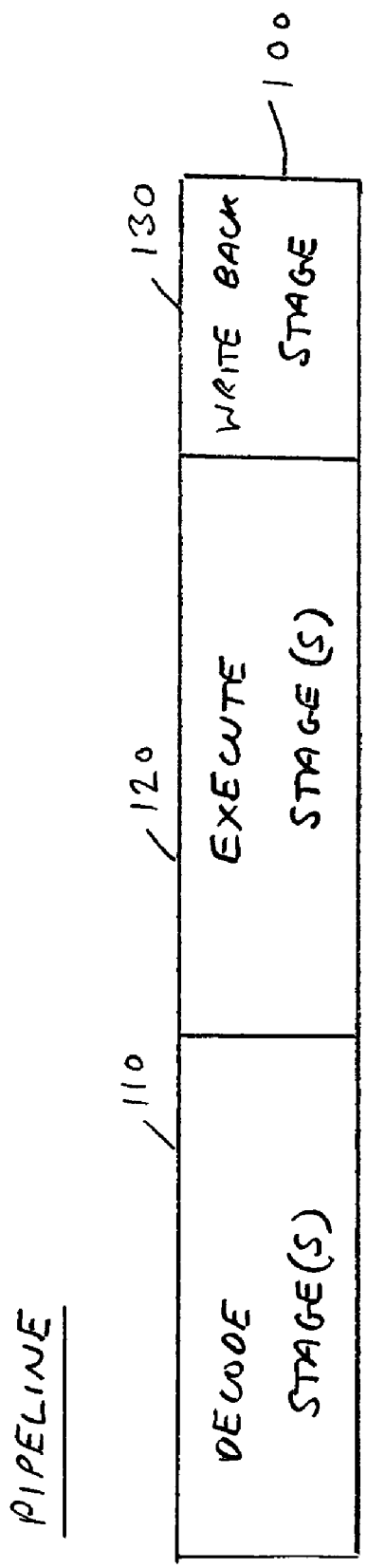
FIG. 2 is a diagram schematically illustrating the various stages that may be provided within the pipelines shown in FIG. 1.

FIG. 2 is a diagram schematically illustrating the various stages that may be provided within each of the pipelines 20, 30 of FIG. 1. Each pipeline will include a number of decode stages 110. In some embodiments, a single decode stage may be appropriate, but in one example embodiment three decode stages are provided. After the decode stages, the decoded instruction enters a number of execute stages 120, where the data processing operation specified by the instruction is performed upon the data value(s) specified as input operand(s). The number of execute stages provided will typically depend on the type of operation being performed within the pipeline. In one example embodiment, the processing unit 10 of FIG. 1 performs processing of graphics data, and five execute stages 120 are provided.

Following the execute stages 120, a write back stage 130 is provided during which the result data is written to the register file 70 from the pipeline. Often, this write back stage 130 is referred to as one of the execute stages.

Figure 3:
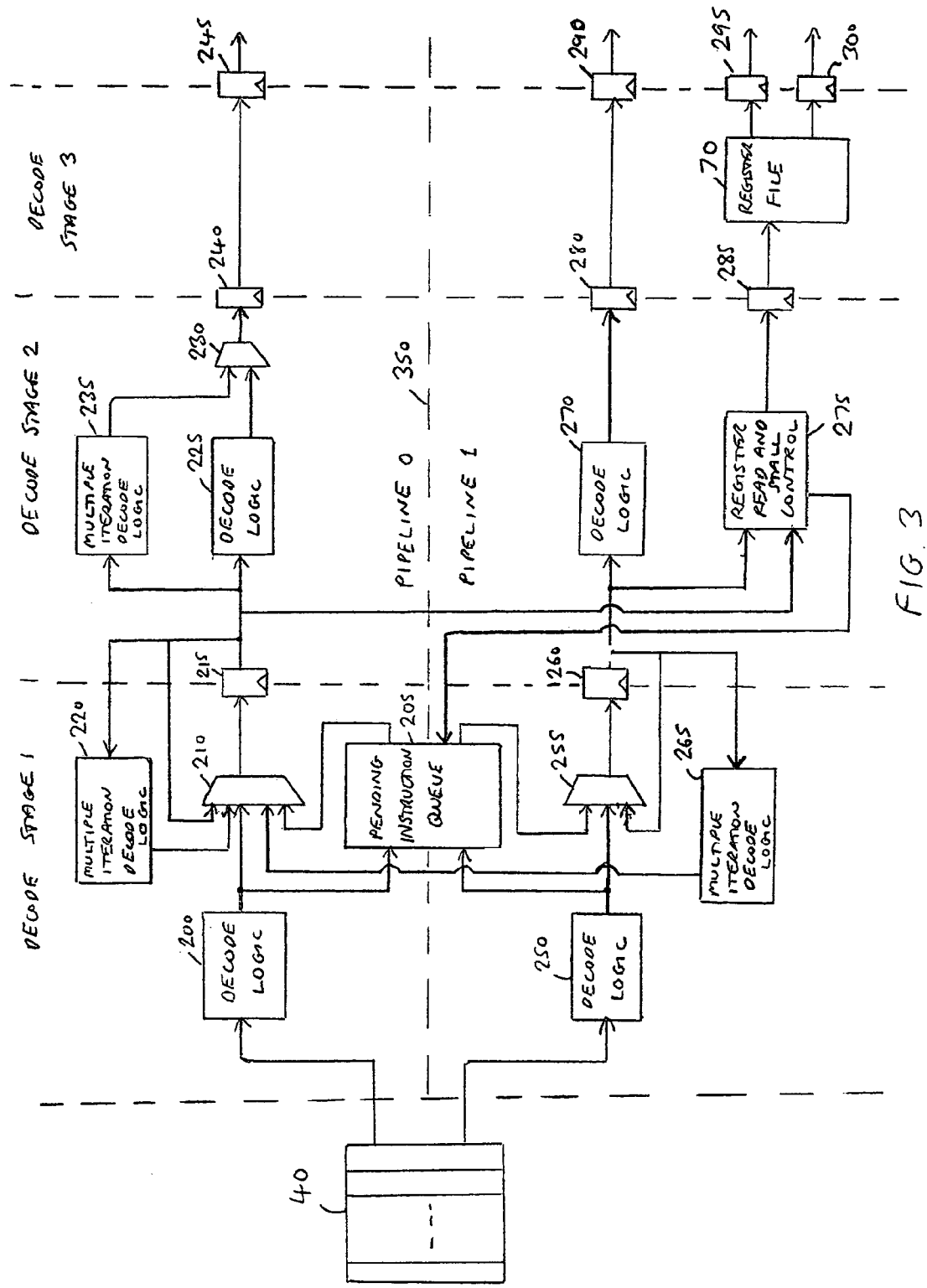
FIG. 3 is a block diagram illustrating in more detail three decode stages provided within the pipelines of the processing unit of FIG. 1.

FIG. 3 is a block diagram illustrating in more detail the three decode stages provided within the pipelines 20, 30 in accordance with one example embodiment. The instruction stream to be executed by the processing unit 10 is stored within the instruction queue 40. As shown in FIG. 3, the logic provided in pipeline zero 20 is that logic above the line 350 of FIG. 3, whereas the logic provided in pipeline one 30 is that logic below line 350 of FIG. 3. The pending instruction queue 205 can be considered to exist within both pipelines.

The processing unit 10 is generally able to accept two instructions each cycle, and accordingly one instruction will be routed to the decode logic 200 of pipeline zero and another instruction will be issued to the decode logic 250 of pipeline one. The only time two instructions cannot be issued into the pipeline is if there is a stall in one or both of the pipelines, or if pipeline zero is handling iterations of a multiple iteration instruction, as will be discussed later.

The processing unit 10 employs a strict in-order retirement scheme, and pipeline zero is arranged to always receive the earlier instruction in situations where two instructions are being input to the processing unit 10 in a single clock cycle. Accordingly, the earlier instruction in the instruction stream will be routed to decode logic 200 and the later instruction will be routed to decode logic 250. The instructions are then decoded by the decode logic 200, 250 with the decoded instruction then being routed to the multiplexers 210, 255, respectively, from where they are then forwarded to the registers 215, 260, respectively, for latching at the end of the first decode stage. Each decode logic unit 200, 250 also routes the opcode and decoded information to the pending instruction queue 205.

In the next cycle, the contents of the registers 215, 260 are output to decode logic 225, 270, respectively, in the second decode stage, where further decoding of the instructions takes place, with the decoded information then being output to the registers 240, 280 at the end of the second decode stage. The data output from the registers 215, 260 contains sufficient information to determine the source registers and destination register for each instruction, and this information is routed to register read and stall control logic 275 which determines which source registers need to be accessed, and also determines whether there is any data dependency between the instructions. Information as to the source registers to be accessed in the register file 70 is stored in register 285 at the end of the second decode stage.

If it is determined that either of the instructions being decoded in the second decode stage specify source registers which are also destination registers of instructions already within either pipeline but which are still in the process of execution, then the register read and stall control logic 275 will issue a control signal to cause that instruction to be stalled in the second decode stage. If the instruction in the second decode stage of pipeline zero is the instruction which needs to be stalled then the instruction in the second decode stage of pipeline one will also be stalled to ensure in-order retirement. This will also cause the instructions in the first decode stage of the corresponding pipelines to be stalled. If it is only the instruction in the second decode stage of pipeline one which has a data dependency, then it will be necessary to stall that instruction in the second decode stage of pipeline one, but the instruction in the second decode stage of pipeline zero can continue into the next decode stage, since that instruction relates to an earlier instruction in the instruction sequence.

The control signal issued by the control logic 275 is routed to the pending instruction queue 205. The pending instruction queue 205 can then control the multiplexers 210, 255 to ensure that the stall is handled correctly. For example, it will be appreciated from FIG. 3 that the outputs of the registers 215, 260 are routed back as one of the inputs to the multiplexers 210, 255, respectively, and accordingly through appropriate control of the multiplexers 210, 255, an instruction stalled in the second decode stage can be passed again through the second decode stage in a subsequent cycle. Further, once that stalled instruction is allowed to pass through the second decode stage, then the instructions that had been decoded in the first decode stage can be routed to the registers 215, 260, this occurring as a result of the pending instruction queue 205 outputting the necessary decoded instruction information to the relevant multiplexer(s) 210, 255, and causing the multiplexer(s) to output that information to the associated register(s) 215, 260.

In the third decode stage the decoded instructions in the registers 240, 280 are merely routed through to the registers 245, 290 from where they can then be routed on to the execute stages. Further, the source operand information in the registers 285 is used to control outputs from the register file 70, with the required source operand data for pipeline zero being stored in register 295 and the required source operand data for pipeline one being stored in register 300.

In accordance with example embodiments, the processing unit 10 can also handle multiple iteration instructions appearing in the instruction sequence, examples of such multiple iteration instructions being load multiple instructions or store multiple instructions. When a multiple iteration instruction is encountered, it can either pass to the decode logic 200 of pipeline zero or the decode logic 250 of pipeline one. Hence, if it is the first instruction in a pair, it will be routed to the decode logic 200 and if it is the second instruction in a pair, it will be routed to the decode logic 250. This will result in the decoded first iteration of the instruction being routed through the multiplexer 210, 255 and into the register 215, 260 of the pipeline to which that multiple iteration instruction is passed. In the next decode stage, the decoded first iteration will pass through decode logic 225, 270, dependent upon which pipeline that first iteration was allocated to, and in due course that iteration will then pass through the third decode stage and on into the execute stages.

However, in accordance with one example embodiment, any further iterations of the multiple iteration instruction need to be handled in pipeline zero 20 irrespective of whether the first iteration was handled by pipeline zero or pipeline one. Considering first the situation where the first iteration passed through pipeline zero, then when the first iteration is output from register 215, it is also routed back to multiple iteration decode logic 220, which then produces the decoded information for the second iteration and outputs that information to the multiplexer 210, which is then controlled to output that data into the register 215. When the second iteration then passes into the second decode stage, it is passed through multiple iteration decode logic 235 and routed via the multiplexer 230 into the register 240. At the same time, the output from the register 215 is routed back to the multiple iteration decode logic 220, to cause the third iteration (if applicable) to be decoded, with the output from decode logic 220 then being routed via multiplexer 210 into the register 215. This process can be repeated for each subsequent iteration of the multiple iteration instruction.

If the first iteration passed through pipeline one, then when that iteration enters the second decode stage, the data is also routed from register 260 back to the multiple iteration decode logic 265 which generates the necessary decode information for the second iteration. However, this information is not input to the multiplexer 255, but instead is output to the multiplexer 210 of pipeline zero, and the multiplexer 210 is arranged to cause that data to be stored within the register 215. From this point on, the handling of the multiple iteration instruction occurs entirely within pipeline zero using the above described sequence of processing.

A number of benefits are realised when adopting the above described approach for handling multiple iteration instructions. Firstly, by allow the flexibility for the first iteration of the multiple iteration instruction to be handled by either pipeline zero or pipeline one, it is possible to avoid a delay in beginning execution of the multiple iteration instruction that might otherwise occur if only pipeline zero were allowed to handle the multiple iteration instruction. In particular, it can be seen that if the multiple iteration instruction is the second instruction of a pair, then in accordance with embodiments of the present invention, the first instruction in the pair can be issued to the decode logic 200 whilst the multiple iteration instruction is issued to the decode logic 250. In a typical prior art superscalar system, this would not be possible, and in particular the multiple iteration instruction would not be able to be executed in parallel with the other instruction of the pair. Instead, in a first cycle the first instruction would be issued to decode logic 200, and in a second cycle the multiple iteration instruction would be issued to the decode logic 200, thereby incurring a one cycle penalty.

Furthermore, in example embodiments, by ensuring that all iterations other than the first iteration are always handled by pipeline zero, this limits the amount of multiple iteration decode logic that needs to be provided within pipeline one. In particular, multiple iteration decode logic only needs to be provided within the first decode stage of pipeline one, since, as discussed above, all subsequent iterations are handled within pipeline zero, and accordingly can be handled by the multiple iteration decode logic 220, 235 of pipeline zero. This keeps the area and power costs down. It should also be noted that if all iterations of the multiple iteration instruction were to be allowed to pass through pipeline one it would be necessary to provide a lock-out mechanism in association with pipeline zero to stop any further instructions in the instruction sequence being issued into pipeline zero until the last iteration of the multiple iteration instruction is executed. By ensuring that all subsequent iterations are instead handled by pipeline zero, no such lock-out mechanism needs to be provided in association with pipeline zero.

Figure 4A:
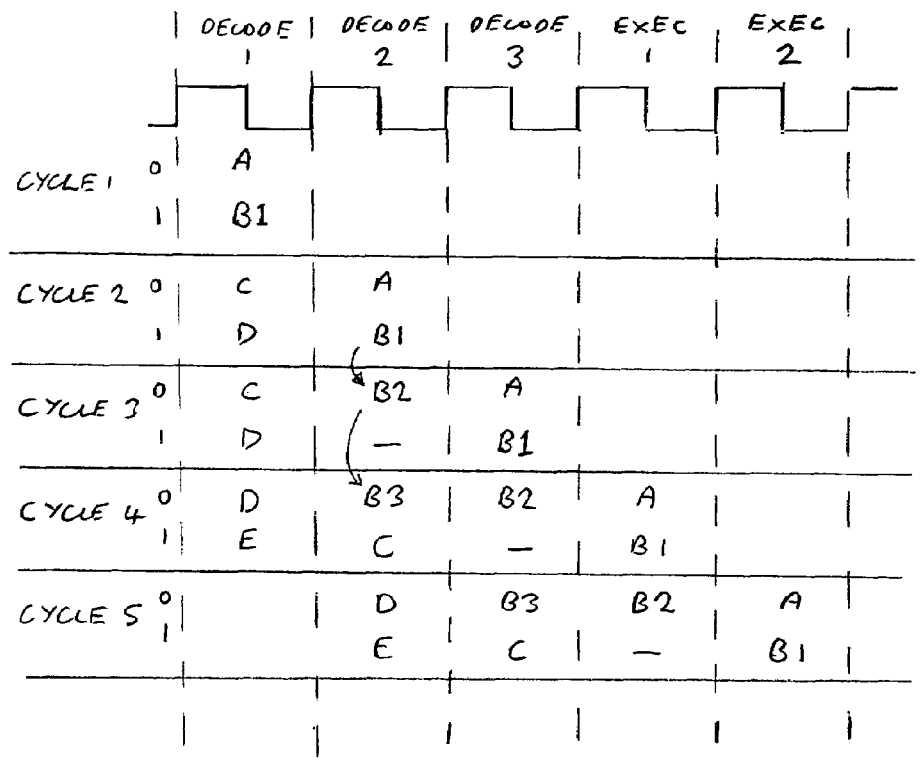
FIGS. 4A and 4B are diagrams schematically illustrating the progress of a sequence of instructions through the pipelines of the processing unit when employing the technique of one embodiment of the present invention, or employing a standard technique, respectively.

FIG. 4A is a diagram schematically illustrating the execution of a sequence of instructions "A B C D E" within the processing unit 10 of one example embodiment. In the example, it is assumed that instruction B is a multiple iteration instruction having three iterations, these iterations being referred to as B1, B2 and B3. As can be seen from FIG. 4A, in a first cycle, both instruction A and the first iteration B1 of instruction B can be passed into the processing unit 10, instruction A passing into pipeline zero and iteration B1 of instruction B passing into pipeline one. In the next cycle, these instructions will pass into the second decode stage and instructions C and D will pass into the first decode stage of pipelines zero, one, respectively. Whilst decode logic 200 and 250 will decode instructions C and D in this second cycle with the results being stored in the pending instruction queue 205, the earlier described mechanism involving multiple iteration decode logic 265 will cause the second iteration B2 of the instruction B to be decoded and routed to the register 215. Accordingly, in the third cycle, the instruction A and iteration B1 of instruction B will enter the third decode stage, whilst iteration B2 of instruction B will enter the second decode stage of pipeline zero. However, to ensure strict in-order retirement, no instruction will be allowed to enter the second pipeline stage of pipeline one, since iteration B2 is not the last iteration of the multiple iteration instruction.

In the next cycle, the instruction A and iteration B1 of instruction B will pass into the first execute stage, whilst iteration B2 passes into decode stage three. Further, iteration B3 (generated by multiple iteration decode logic 220 in cycle three) will be output into the second decode stage. Since iteration B3 is the final iteration, the next instruction in the instruction sequence, namely instruction C, can be issued in parallel with iteration B3, this being achieved by the pending instruction queue 205 routing the necessary data via multiplexer 255 into the register 260 during cycle three so that it can then be output into the second decode stage of pipeline one during cycle four. Also during cycle four, a new instruction E enters the decode stage one and is decoded. Finally, in cycle five, each of the instructions moves to the next stage. The remaining execute stages and write back stages are not shown, as they are not required to illustrate the benefit achieved when using the embodiment of the present invention.

Figure 4B:
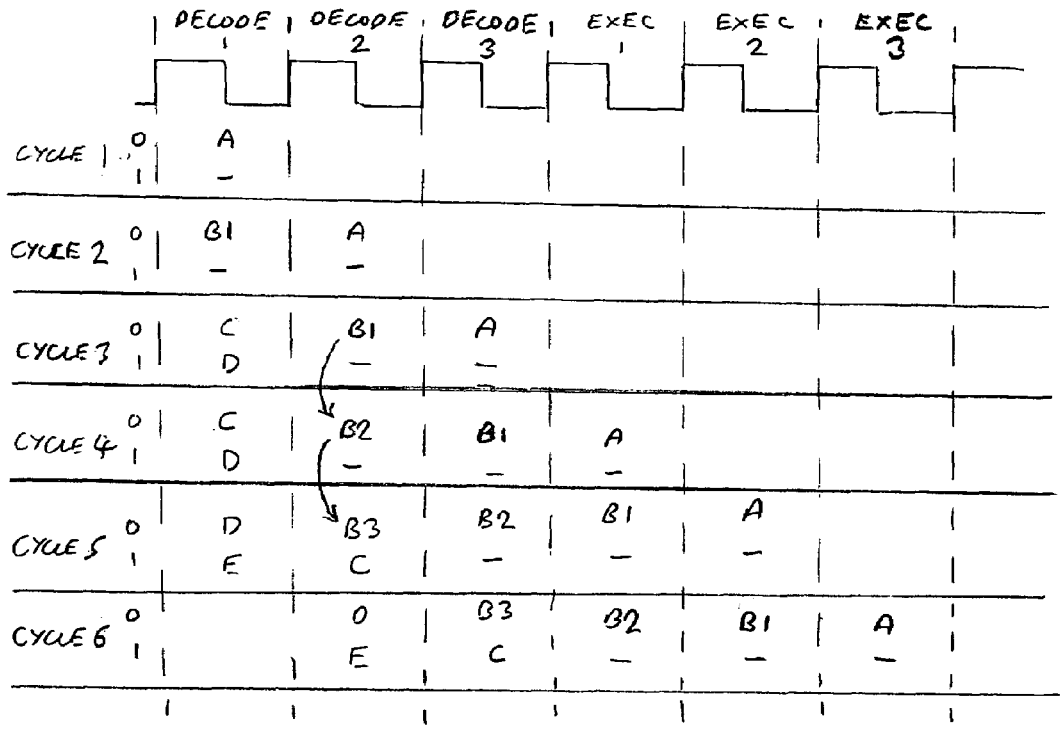

FIG. 4B illustrates execution of the same sequence of instructions within a processing unit 10 which is similarly designed to that described with reference to FIG. 3, but in which it is not possible to issue the multiple iteration instruction to pipeline one. In this scenario, it will be appreciated that in the first cycle only instruction A can be passed into decode stage one, since it is the earliest instruction in the sequence and accordingly must go into pipeline zero, and also instruction B cannot go into pipeline one because it is a multiple iteration instruction. In the second cycle, instruction A will pass into the second decode stage and instruction B can pass into the first decode stage of pipeline zero to cause iteration B1 to be decoded. In the third cycle, the instructions move into the next respective decode stages and instructions C and D enter the first decode stages, instruction C going into pipeline zero and instruction D going into pipeline one. During this cycle, multiple iteration decode logic 220 will generate the second iteration B2 of instruction B and cause that decoded information to be stored in the register 215.

Accordingly, in cycle four, iteration B2 of instruction B is issued into the second decode stage whilst iteration B1 moves into the third decode stage and instruction A moves into the first execute stage. In the fifth cycle, the third and final iteration B3 of instruction B is issued into the second decode stage, and at the same time instruction C is issued into the second decode stage of pipeline one using the same mechanism as described earlier with reference to FIG. 4A. The process then proceeds in exactly the same manner as described earlier with reference to FIG. 4A. As can seen from a comparison of FIGS. 4A and 4B, when the example embodiment is not used, a one cycle penalty occurs when executing such a sequence of instructions.

In accordance with above described example embodiments, this improved performance is realized without any additional complexity to pipeline zero, and with the addition of only a small amount of multiple iteration decode logic to the first decode stage of pipeline one.

Accordingly, a particularly efficient technique is provided for handling instruction sequences within a superscalar processor in situations where the instruction sequence may include multiple iteration instructions.

Although example embodiments have been described herein, it will be apparent that many modifications and additions may be made. For example, various combinations of the features of the following dependent claims could be made with the features of the independent claims.

We claim:

1. A data processing apparatus comprising:
   an instruction store operable to store a sequence of instructions including at least one multiple iteration instruction; and
   a processing unit operable to execute the sequence of instructions, the processing unit comprising at least a first processing path and a second processing path to enable at least two instructions of the sequence to be executed in parallel, wherein:
   for each instruction in said sequence, the instruction store is operable to issue that instruction to one of the first processing path or the second processing path,
   when executing instructions in parallel, the first processing path is operable to execute an instruction which is earlier in the sequence than the instruction executed in the second processing path,
   the multiple iteration instruction is an instruction which when issued once to a processing path by the instruction store is iteratively executed multiple times within the processing unit, and
   when executing the multiple iteration instruction, the processing unit is operable to cause a first iteration of the multiple iteration instruction to be executed in that one of the first processing path or the second processing path to which the multiple iteration instruction has been issued by the instruction store, but to cause all remaining iterations of the multiple iteration instruction to be executed in the first processing path.

2. A data processing apparatus as claimed in claim 1, wherein when executing the at least one multiple iteration instruction, the processing unit is operable to not allow execution of an instruction later in the sequence of instructions until execution of the last iteration of the multiple iteration instruction.

3. A data processing apparatus as claimed in claim 1, wherein the first and second processing paths are pipelined processing paths such that a plurality of instructions can be in the process of execution in each of the first and second pipelined processing paths.

4. A data processing apparatus as claimed in claim 3, wherein each of the first and second pipelined processing paths includes multiple decode stages, each decode stage comprising decode logic for at least partially decoding an instruction in that decode stage, in the second pipelined processing path only the decode logic of a first decode stage including multiple iteration decode logic operable to decode a multiple iteration instruction.

5. A data processing apparatus comprising:
   instruction storage means for storing a sequence of instructions including at least one multiple iteration instruction;
   processing means for executing the sequence of instructions, the processing means comprising at least first processing path means and second processing path means for enabling at least two instructions of the sequence to be executed in parallel, wherein:
   for each instruction in said sequence, the instruction storage means is operable to issue that instruction to one of the first processing path means or the second processing path means,
   the at least one multiple iteration instruction is an instruction which when issued once to a processing path means by the instruction storage means is iteratively executed multiple times within the processing means,
   when executing instructions in parallel, the first processing path means is operable to execute an instruction which is earlier in the sequence than the instruction executing in the second processing path means,
   the processing means is arranged, when executing the at least one multiple iteration instruction, to cause a first iteration of the multiple iteration instruction to be executed in that one of the first processing path means or the second processing path means to which the at least one multiple iteration instruction has been issued by the instruction storage means, but to cause all remaining iterations of the multiple iteration instruction to be executed in the first processing path means.

6. A method of executing a sequence of instructions within a data processing apparatus, the sequence of instructions including at least one multiple iteration instruction, the data processing apparatus having a processing unit comprising at least a first processing path and a second processing path to enable at least two instructions of the sequence to be executed in parallel, the method comprising:
   for each instruction in said sequence, issuing that instruction to one of the first processing path or the second processing path, where the multiple iteration instruction is an instruction which when issued once to a processing path by the instruction store is iteratively executed multiple times,
   when executing instructions in parallel, executing within the first processing path an instruction which is earlier in the sequence than the instruction executing in the second processing path; and
   when executing the at least one multiple iteration instruction, causing a first iteration of the multiple iteration instruction to be executed in that one of the first processing path or the second processing path to which the multiple iteration instruction has been issued, but causing all remaining iterations of the multiple iteration instruction to be executed in the first processing path.

* * * * *